United States Patent [19]

Hisaoka et al.

[11] Patent Number: 5,076,836
[45] Date of Patent: Dec. 31, 1991

[54] PROCESS FOR THE PREPARATION OF FERROMAGNETIC METALLIC PARTICLES FOR MAGNETIC RECORDING

[75] Inventors: Isshi Hisaoka; Masakazu Konno, both of Tamano; Nobuo Takagi, Higashimurayama, all of Japan

[73] Assignee: Mitsui Mining & Smelting Co., Ltd., Tokyo, Japan

[21] Appl. No.: 632,472

[22] Filed: Dec. 21, 1990

[30] Foreign Application Priority Data

Oct. 9, 1990 [JP] Japan .................................. 2-269643

[51] Int. Cl.$^5$ .................................................. H01F 41/02
[52] U.S. Cl. ........................................ 75/349; 423/151; 423/152; 148/105
[58] Field of Search ............... 423/151, 152, 309, 313; 148/105; 75/309

[56] References Cited

U.S. PATENT DOCUMENTS 4,543,197 9/1985 Karasawa et al. .................. 423/152
4,576,635 3/1986 Araki et al. ......................... 148/105

FOREIGN PATENT DOCUMENTS 58-192308 11/1983 Japan .................................. 423/151
62-108737 5/1987 Japan .................................. 423/152

Primary Examiner—R. Dean
Assistant Examiner—George Wyszomierski
Attorney, Agent, or Firm—Bucknam and Archer

[57] ABSTRACT

A process for the preparation of ferromagnetic metallic particles for magnetic recording which comprises
(I) a step of preparing a slurry of acicular iron oxide hydrate containing nickel and, if necessary, manganese,
(II) a step of coating the surface of the above iron oxide hydrate with aluminum-containing iron oxide hydrate, thus giving a slurry containing the coated iron oxide hydrate and free aluminate ions,
(III) a step of depositing aluminum and phosphorus and/or silicon on the outside surface of the aluminum-containing iron oxide hydrate, thereby giving a slurry of the iron oxide hydrate thus treated,
(IV) a step of subjecting the slurry to washing, drying and dehydrating, reducing the obtained particles, and forming an oxide layer on the surface of the reduced particles.

18 Claims, 3 Drawing Sheets

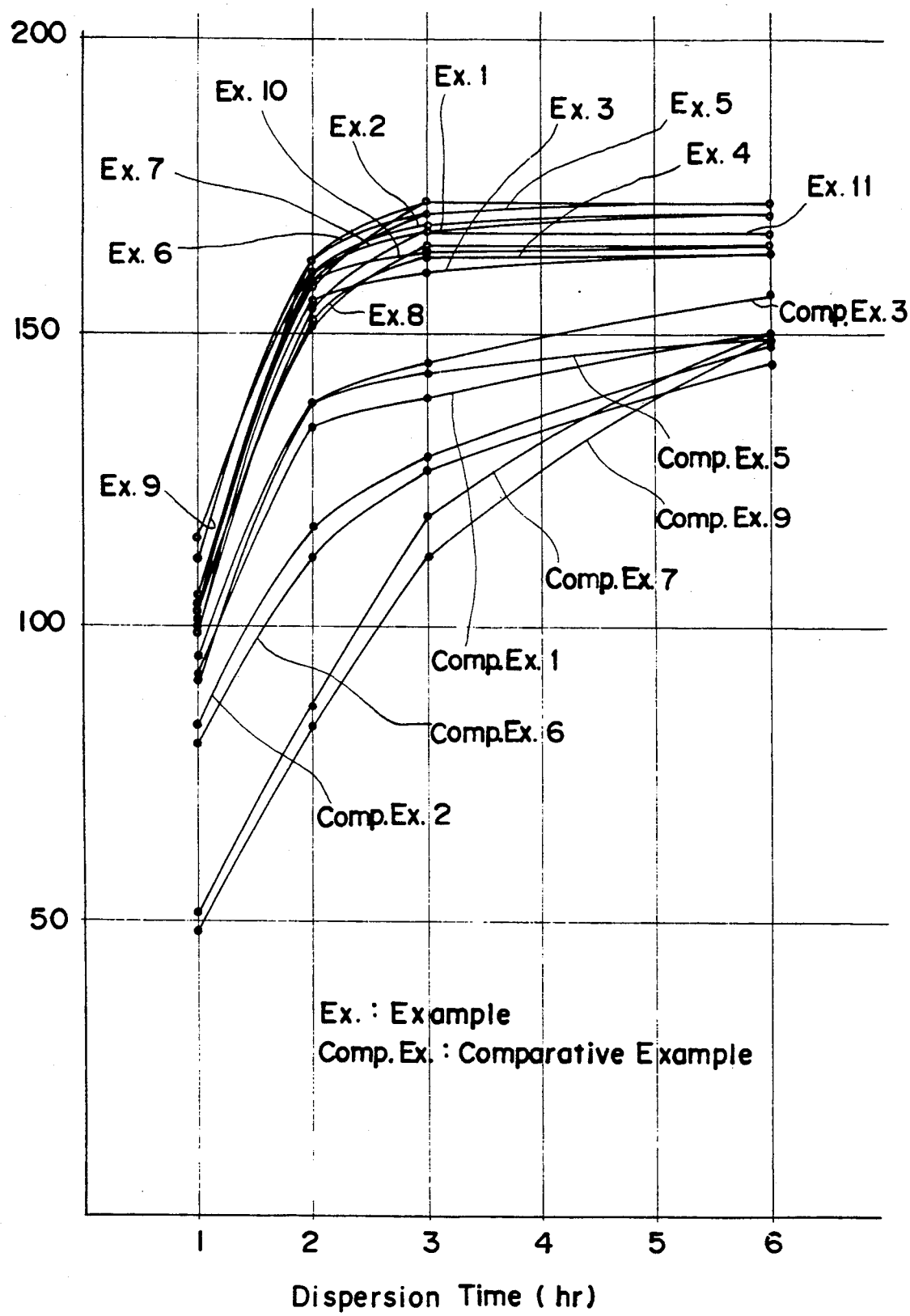
F I G. 1

PROCESS FOR THE PREPARATION OF FERROMAGNETIC METALLIC PARTICLES FOR MAGNETIC RECORDING

BACKGROUND OF THE INVENTION

1. Field of the Invention

The present invention relates to a process for the preparation of ferromagnetic metallic particles for magnetic recording. Particularly, it relates to a process for the preparation of ferromagnetic metallic particles for magnetic recording which are improved in the dispersibility, particularly the easiness of dispersion, the magnetic stability, and the magnetic properties, particularly the coercivity, and which can satisfy the demands for finer ferromagnetic metallic particles. The process is shortened and simplified in the processing steps and is economically advantageous.

2. Prior Art

With the purpose of improving the magnetic recording density and the playback output, recently, coated type magnetic recording media using ferromagnetic metallic particles comprising pure iron or containing iron as a main component have been put to practical use.

However, such ferromagnetic metallic particles, having poorer magnetic stability, deteriorate more easily with the lapse of time than magnetic iron oxide particles and they are liable to agglomerate to result in poor dispersion, though they have an advantage of higher magnetic recording density.

Further, in a recent tendency toward the higher magnetic recording density, finer ferromagnetic metallic particles are desired. But the poorer magnetic stability and dispersibility of finer ferromagnetic metallic particles have become more and more serious problems.

Although various proposals including the incorporation of aluminum or other elements into ferromagnetic metallic particles have been made in order to solve these problems, the problem of poor dispersion has not been solved as yet. Further, from the standpoint of both cost and productivity, it is an important factor to shorten the dispersion time in the preparation of coated type magnetic recording media. That is, ferromagnetic metallic particles which have the easiness of dispersion are more desirable. The term "the easiness of dispersion" used in this specification refers to the time required for gloss and squareness of the coated sheet to reach respective equilibria when the particles are dispersed by a sand mill into a magnetic paint. The longer this time, the poorer the easiness of dispersion. Recently, it is particularly strongly required to improve this easiness of dispersion.

For example, Japanese Patent Laid-Open Gazette No. Sho. 57-73105 discloses a process for the preparation of ferromagnetic metallic particles by using iron oxide hydrate containing aluminum in a solid solution state. However, this process necessitates very restricted conditions including an excess alkali concentration of 0.4N or below and a liquid temperature of 40° to 50° C., so that the process is unsuitable for the preparation of fine ferromagnetic metallic particles having high coercivity, and the obtained particles are not improved in the dispersibility.

Further, Japanese Patent Laid-Open Gazette No. Sho. 64-33019 discloses a process for the preparation of acicular iron oxide hydrate which comprises reacting an aqueous solution of a ferrous salt with an aqueous solution of an alkali hydrate to give an aqueous suspension of ferrous hydrate and introducing an oxygen-containing gas into the suspension, while adding an aluminum compound thereto. However, the ferromagnetic metallic particles prepared by this process are not improved in the dispersibility. Further, the yield of aluminum is low resulting in low productivity, and the control of powder properties is difficult. Furthermore, the particles are apt to become dendritic to thereby worsen the switching field distribution (SFD).

Furthermore, Japanese Patent Laid-Open Gazette No. Sho. 64-140005 discloses a process which comprises adding an aluminum compound and a ferrous salt to an aqueous suspension of iron oxide hydrate, oxidizing the obtained mixture, and coating the surface of the obtained particles by Ni, a water-soluble carboxylic acid, and a silicon compound. However, the ferromagnetic metallic particles prepared by this process have a problem of hindering the effect of aluminum which contributes to the dispersibility of the particles. Further, this process must be conducted in a pH range of 8 to 12, so that a part or most of aluminum precipitates as hydroxide not only on the surface of particles but also at other places, so that the obtained particles are not improved in the dispersibility. Further, the process has another problem of necessitating very complicated stages, thus lowering the productivity.

SUMMARY OF THE INVENTION

The present invention has been made to solve the problems of the prior art and an object of the present invention is to provide a process for the preparation of ferromagnetic metallic particles for magnetic recording which are improved in the dispersibility, particularly the easiness of dispersion, the magnetic stability, and the magnetic properties, particularly the coercivity and which can satisfy the demands for finer ferromagnetic metallic particles. The process is shortened and simplified in the processing steps and is economically advantageous.

The above object of the present invention can be attained by coating the surface of acicular iron oxide hydrate containing nickel and, if necessary, manganese with aluminum-containing iron oxide hydrate and depositing aluminum and phosphorus and/or silicon on the surface of the obtained particles.

Namely, the process for the preparation of ferromagnetic metallic particles for magnetic recording of the present invention comprises:

(I) a step of mixing a mixed aqueous solution of a ferrous salt and a nickel salt with an excess of an aqueous solution of an alkali, sufficiently stirring the obtained mixture, and oxidizing the mixture to give a slurry of nickel-containing acicular iron oxide hydrate, (II) a step of sufficiently stirring a mixture obtained by adding an aqueous solution of a ferrous salt and an excess of an aqueous solution of an aluminum salt or an aluminate to the slurry obtained in the step (I) and oxidizing the mixture to coat the surface of the nickel-containing iron oxide hydrate with aluminum-containing iron oxide hydrate at an alkali concentration of 0.5 to 5.0 mol/l, thus giving a slurry containing the coated particles and free aluminate ions, (III) a step of sufficiently stirring a mixture obtained by adding an aqueous solution of phosphoric acid or a salt thereof and/or an aqueous solution of silicic acid or a salt thereof to the slurry obtained in the step (II), neutralizing the mixture, and aging the neutralized mixture to deposit aluminum and phosphorus and/or silicon on the outside surface of the outer layer-forming aluminum-containing iron oxide hydrate, thereby giving a slurry of the iron oxide hydrate thus treated, and (IV) a step of subjecting the slurry obtained in the step (III) to washing, drying, dehydrating, reducing the obtained particles in a reducing gas, and forming an oxide layer on the surface of the reduced particles.

DETAILED DESCRIPTION OF THE PREFERRED EMBODIMENTS

The present invention will now be described in more detail.

In the step (I) according to the present invention, an aqueous solution of a ferrous salt, a nickel salt, and an excess of an aqueous solution of an alkali are mixed together and the obtained mixture is sufficiently stirred and oxidized to give a slurry of acicular nickel-containing iron oxide hydrate (FeOOH). In this step, a manganese salt may be used in addition to the nickel salt.

Although the salts of iron (II), nickel and manganese used in this step include sulfates, chlorides, nitrates, acetates and carbonates, sulfates are preferably used from the standpoint of economic efficiency and the stability of the reaction. The salts may be added either as a mixed solution of the salts or as separate aqueous solutions containing each of the salts respectively. Although the alkali is not particularly limited and includes sodium hydroxide and potassium hydroxide, sodium hydroxide is generally used.

According to the present invention, an alkali must be used in an excessive amount compared to the total amount of ferrous salt, nickel salt and manganese salt used, so that unreacted alkali remains in the obtained slurry.

For example, it is preferable to use 0.5 to 3.0 l of a mixed aqueous solution containing $FeSO_4$ at a concentration of 0.1 to 1.0 mol/l, $NiSO_4$ at a concentration of 0.001 to 0.1 mol/l and $MnSO_4$ at a concentration of 0 to 0.1 mol/l per l of an aqueous solution of NaOH having a concentration of 4 to 18 mol/l and to leave, after the completion of the reaction, unreacted NaOH at a concentration of 1.0 to 7.0 mol/l.

The components described above are sufficiently mixed and stirred together and oxidized to give a slurry containing acicular iron oxide hydrate containing nickel and, if necessary, manganese. The oxidation is preferably conducted by blowing air or oxygen into the mixture at 20° to 60° C.

It is preferable that the nickel and manganese contents of the iron oxide hydrate obtained in the above step (I) be 1.1 to 10 atomic % and 0 to 10 atomic % respectively, based on the amount of iron in the iron oxide hydrate obtained in the step (I).

In the step (II) according to the present invention, an aqueous solution of a ferrous salt and an excess of an aqueous solution of an aluminum salt or an aluminate are added to the slurry prepared in the step (I) comprising iron oxide hydrate containing nickel and, if necessary, manganese (hereinafter sometimes referred to as "core-forming iron oxide hydrate") and the obtained mixture is sufficiently stirred and oxidized to coat the surface of the core-forming iron oxide hydrate with aluminum-containing iron oxide hydrate (hereinafter sometimes referred to as "outer layer-forming iron oxide hydrate"). Thus, a slurry containing the coated iron oxide hydrate and free aluminate ion is obtained.

The oxidation in this step is also preferably carried out by blowing air or oxygen into the mixture at 20° to 60° C.

Although the ferrous salt usable in the step (II) includes the same salts as those listed in the step (I), ferrous sulfate is preferably used. The aluminum salt includes aluminum sulfate and the aluminate includes sodium aluminate and potassium aluminate. In this step, these salts may be added either as a mixed aqueous solution of the salts or as separate aqueous solutions containing each of the salts respectively. An aluminum salt or an aluminate must be used in an excessive amount so as to give a slurry in which free aluminate ion remains.

For example, it is preferable to use 0.1 to 0.5 l of an aqueous solution of $FeSO_4$ having a concentration of 0.1 to 2.0 mol/l and 0.05 to 0.1 l of an aqueous solution of $NaAlO_2$ having a concentration of 0.1 to 1.5 mol/l per l of the slurry of iron oxide hydrate prepared in the step I which contains iron in an amount of 0.25 mol/l, nickel, and if necessary, manganese.

After the completion of the step (II), the alkali concentration of the slurry is 0.5 to 5.0 mol/l, preferably 1.0 to 3.0 mol/l.

The aluminum content of the outer layer-forming iron oxide hydrate is 2.0 to 10 atomic % based on the total amount of the iron in the iron oxide hydrate obtained in the steps (I) and (II).

Further, the ratio of the amount of iron contained in the core-forming iron oxide hydrate to the total amount of the whole iron is 30 to 90%. Accordingly, the ratio of the amount of iron contained in the outer layer-forming iron oxide hydrate thereto is 70 to 10%.

In the step (III) according to the present invention, an aqueous solution of phosphoric acid or a salt thereof and/or an aqueous solution of silicic acid or a salt thereof are added to the slurry prepared in the step (II), and the obtained mixture is sufficiently stirred, neutralized with, e.g., sulfuric acid and aged to deposit aluminum and phosphorus and/or silicon on the outside surface of the outer layer-forming iron oxide hydrate, thereby obtaining a slurry of iron oxide hydrate thus treated.

The salts of phosphoric acid and silicic acid each include salts thereof with sodium and potassium.

It is preferable to use 0.005 to 0.01 l of an aqueous solution of $NaH_2PO_4$ having a concentration of 0.1 to 1.0 mol/l and 0.005 to 0.01 l of an aqueous solution of $Na_2SiO_3$ having a concentration of 0.1 to 1.0 mol/l per l of the slurry of the iron oxide hydrate prepared in the step (II) which contains iron in an amount of 0.3 mol/l, nickel, aluminum, and if necessary, manganese and contains free aluminate ion dispersed therein.

The components described above are sufficiently mixed and stirred together and the obtained mixture is neutralized and aged to thereby deposit the remaining aluminum and phosphorus and/or silicon on the outside surface of the outer layer-forming iron oxide hydrate.

The amount of aluminum deposited is 3.0 to 15 atomic % and the amount of phosphorus and/or silicon deposited is 0.3 to 1.5 atomic %, based on the amount of the whole iron contained in the final ferromagnetic metallic particles.

In the step (IV) according to the present invention, the obtained slurry of iron oxide hydrate is washed, dried and dehydrated. The drying is conducted at 100° to 200° C. for about 12 hours and the dehydration is conducted in the open air or a nitrogen atmosphere at 300° to 800° C., preferably at 400° to 700° C. The obtained particles are reduced in a reducing gas such as hydrogen or carbon monoxide gas at 400° to 550° C. The formation of an oxide layer on the surface is preferably conducted by placing the reduced particles in a mixed gas comprising an inert gas and oxygen and gradually increasing the oxygen content of the mixed gas finally up to that of the open air.

The prepared ferromagnetic metallic particles for magnetic recording have an acicular shape and preferably contain 1.0 to 5.0 atomic % of nickel, 0 to 5.0 atomic % of manganese, 3.0 to 15 atomic % of aluminum, and 0.3 to 1.5 atomic % of phosphorus and/or silicon based on the amount of the iron in the particles.

Further, from the standpoint of improving the magnetic stability remarkably, it is still preferable that the ferromagnetic metallic particles for magnetic recording contain 1.0 to 5.0 atomic % of nickel, 0.1 to 5.0 atomic % of manganese, 3.0 to 15 atomic % of aluminum, and 0.3 to 1.5 atomic % of phosphorus and/or silicon based on the amount of the iron therein.

It is suitable that the ferromagnetic metallic particles of the present invention have a mean length of 0.10 to 0.35 μm, a mean diameter of 0.015 to 0.025 μm, a length to diameter ratio of 5.0 to 25, and a specific surface area of 50 to 70 $m^2/g$.

As described above, ferromagnetic metallic particles for magnetic recording which are improved in the dispersibility, particularly the easiness of dispersion, the magnetic stability, and the magnetic properties, particularly the coercivity, and which can satisfy the demands for finer ferromagnetic metallic particles can be prepared by the process of the present invention characterized by coating the surface of an acicular iron oxide hydrate containing nickel and, if necessary, manganese with aluminum-containing iron oxide hydrate and depositing aluminum and phosphorus and/or silicon on the outside surface of the aluminum-containing iron oxide hydrate. Particularly, the ferromagnetic metallic particles further containing a specific amount of manganese is extremely improved in the magnetic stability.

Further, the process of the present invention has an advantage that it is shortened and simplified in the processing steps and is excellent in economic efficiency.

BRIEF DESCRIPTION OF THE DRAWINGS

FIG. 1 is a graph showing the relationships between gloss and dispersion time in examples and comparative examples.

PREFERRED EMBODIMENTS OF THE PRESENT INVENTION

Figure 2:
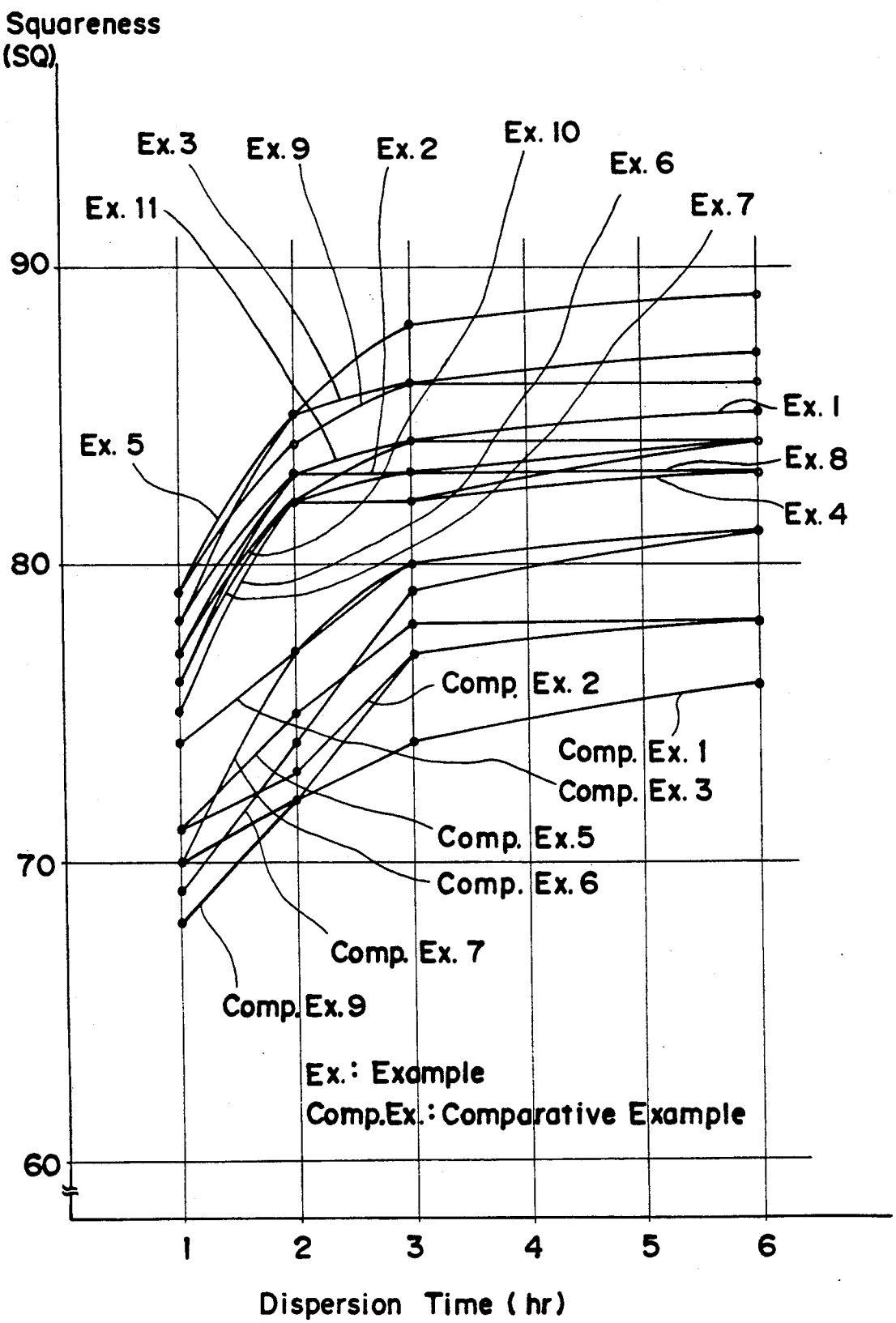
FIG. 2 is a graph showing the relationships between squareness and dispersion time in examples and comparative examples.

The present invention will now be described in more detail by referring to the following examples. All percentage figures in Tables 1 and 2 are atomic percentages, unless otherwise stated.

EXAMPLE 1

2.5 l of a mixed aqueous solution containing $FeSO_4$ at a concentration of 0.47 mol/l, $NiSO_4$ at a concentration of 0.024 mol/l and $MnSO_4$ at a concentration of 0.005 mol/l was added to 1.8 l of an aqueous solution of NaOH having a concentration of 7.8 mol/l, and the mixture was stirred sufficiently for diffusion and dispersion of these components. Air was blown into the obtained mixture for oxidation. Thus, a slurry of iron oxide hydrate containing nickel and manganese was obtained. In the transmission electron microscopy (TEM) of the slurry, no irregular fine particle was detected, which reveals that the conversion into iron oxide hydrate was completely attained. After the completion of the reaction, the content of unreacted NaOH in the slurry was 2.5 mol/l.

The amount of nickel and manganese contained in the iron oxyde hydrate were 5.0 atomic % and 1.0 atomic %, respectively based on the amount of the iron in the iron oxide hydrate obtained in this step.

0.36 l of an aqueous solution of sodium aluminate having a concentration of 0.5 mol/l and 2.0 l of an aqueous solution of $FeSO_4$ having a concentration of 0.31 mol/l were added to the above slurry. The amount of the aluminum to be added in this step was 29 atomic % based on the amount of the iron added in the step (II). The obtained mixture was stirred sufficiently for diffusion and dispersion. Air was blown into the resulting mixture for oxidation. Thus, the surface of the iron oxide hydrate containing nickel and manganese was coated with aluminum-containing iron oxide hydrate. Part of the resulting slurry was taken and filtered and the analysis of the obtained filtrate revealed that about 30% of the aluminum added remained as free aluminate ions and that the NaOH concentration was 1.5 mol/l.

The amount of aluminum contained in the outer layer-forming iron oxide hydrate was 7.0 atomic % based on the total amount of the whole iron.

The amount of iron contained in the core-forming iron oxide hydrate was 65.5% based on the total amount of the whole iron.

0.03 l of an aqueous solution of phosphoric acid having a concentration of 0.5 mol/l was added to the above slurry, followed by sufficient mixing and stirring of the components. The obtained mixture was neutralized and aged to deposit aluminum and phosphorus on the outside surface of the outer layer-forming iron oxide hydrate. Part of the resulting slurry was taken and filtered. The analysis of the obtained filtrate and filtered cake revealed that the remaining aluminate ions were completely deposited on the outside surface of the outer layer-forming iron oxide hydrate.

The amounts of aluminum and phosphorus deposited were 10.0 atomic % and 0.8 atomic %, respectively, based on the total amount of the iron contained in the final ferromagnetic metallic particles.

The resulting slurry was sufficiently washed and dried at 100° to 120° C. overnight. The dried product was dehydrated in the air at 700° C. and reduced in hydrogen gas at 500° C. to give ferromagnetic metallic particles. Finally, a stable oxide layer was formed on the surface of the particles.

As shown in Table 2, the amount of the nickel, manganese, aluminum, and phosphorus contained in the ferromagnetic metallic particles were 3.3 atomic %, 0.7 atomic %, 10.0 atomic %, and 0.8 atomic % respectively based on the amount of the iron contained therein.

As shown in Table 3, the ferromagnetic metallic particles had a mean length of 0.26 μm, a mean diameter of 0.02 μm, and a specific surface area of 60 $m^2/g$.

The ferromagnetic metallic particles were examined for magnetic properties and sheet properties. The magnetic properties include coercivity (Hc), saturation magnetization (δs), switching field distribution (SFD), and degree of deterioration of magnetization after 72 hours in the 60° C., 90% relative humidity atmosphere to examine magnetic stability. The degree of deterioration of magnetization was calculated according to the following equation:

degree of deterioration of magnetization (%) =

$$[(\delta s - \delta s \text{ after 72 hours})/\delta s] \times 100$$

On the other hand, the sheet properties were determined by preparing a sheet according to the process which will be described below and examining the sheet for gloss and squareness (Sq) after 1, 2, 3, and 6 hours of dispersion with a sand mill. The results are given in Table 3.

Figure 3A:
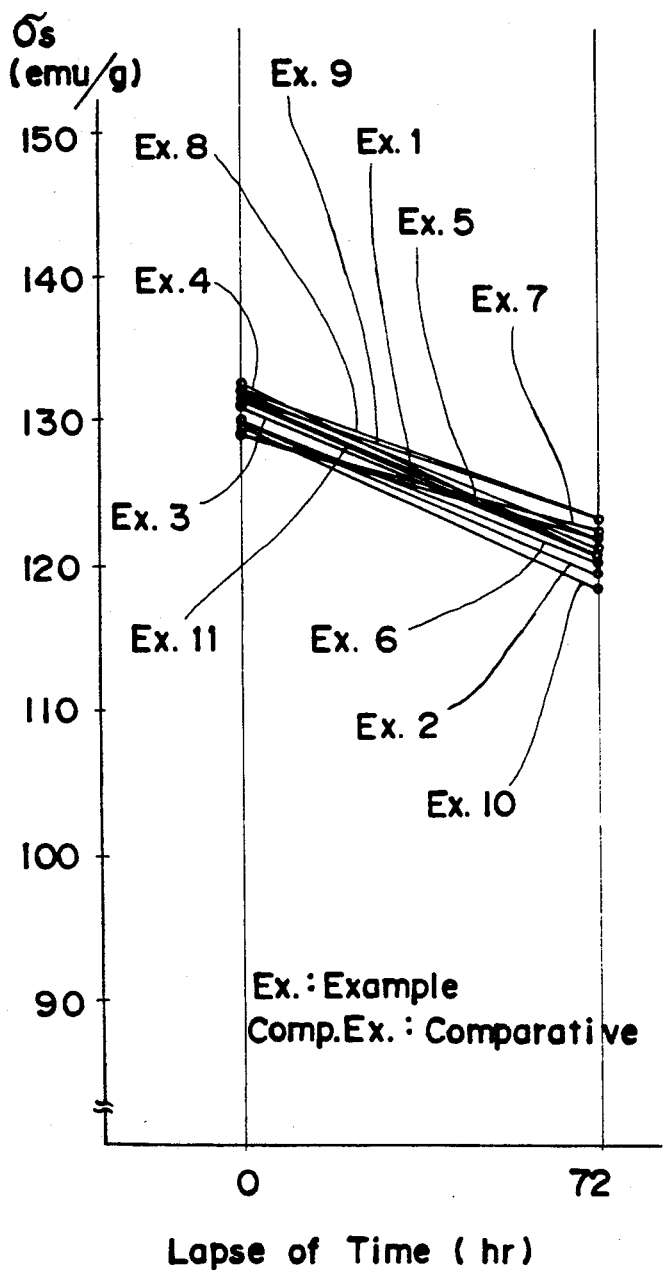
FIGS. 3(a) and 3(b) are graphs showing the relationships between saturation magnetization and the lapse of time in examples and comparative examples.

The relationship between the gloss of sheet and dispersion time and that between squareness and dispersion time are shown in FIGS. 1 and 2, respectively, while that between saturation magnetization and the lapse of time in the 60° C., 90% relative humidity atmosphere is shown in FIG. 3(a).

(Preparation of Sheet)

a) paint composition (parts by weight)

| | |
|---|---|
| pigment (ferromagnetic metallic particles) | 100 |
| polyurethane resin | 10 |
| polyvinyl chloride resin | 10 |
| toluene | 150 |
| MEK | 150 |
| cyclohexanone | 40 |
| lubricant | 1 | b) preparation conditions of paint

The above components were dispersed with a sand mill at 1500 rpm, while repeating sampling every one hour.

c) preparation conditions of sheet

The above paint was applied on a base film, oriented and dried at 100° C.

(Conditions of Measurement)

a) gloss: determined according to JIS Z 8741 at 60° with a gloss meter (mfd. by Nippon Denshoku Kogyo K. K.).

b) squareness (Sq value): determined in magnetic field of 5 kOe with VSM (mfd. by Toei Kogyo K.K.).

EXAMPLE 2

As shown in Table 1, ferromagnetic metallic particles for magnetic recording having a composition specified in Table 2 were prepared by the same process under the same conditions as those of Example 1 except that no manganese sulfate was added in the step (I).

This ferromagnetic metallic particle sample was examined in the same manner as that of Example 1. The results are given in Table 3 and FIGS. 1, 2 and 3(a).

EXAMPLE 3

As shown in Table 1, ferromagnetic metallic particles for magnetic recording were prepared by the same process under the same conditions as those of Example 2 except that the amount of nickel sulfate to be added in the step (I) was changed.

This ferromagnetic metallic particle sample was examined in the same manner as that of Example 1. The results are given in Table 3 and FIGS. 1, 2 and 3(a).

EXAMPLE 4

As shown in Table 1, ferromagnetic metallic particles for magnetic recording having a composition specified in Table 2 were prepared by the same process under the same conditions as those of Example 2 except that the amount of sodium aluminate to be added in the step (II) was changed.

This ferromagnetic metallic particle sample was examined in the same manner as that of Example 1. The results are give in Table 3 and FIGS. 1, 2 and 3(a).

EXAMPLE 5

As shown in Table 1, ferromagnetic metallic particles for magnetic recording having a composition specified in Table 2 were prepared by the same process under the same conditions as those of Example 2 except that the ratio of the amount of the iron of the step (I) to that of the step (II) was changed.

This ferromagnetic metallic particle sample was examined in the same manner as that of Example 1. The results are given in Table 3 and FIGS. 1, 2 and 3(a).

EXAMPLE 6

As shown in Table 1, ferromagnetic metallic particles for magnetic recording having a composition specified in Table 2 were prepared by the same process under the same conditions as those of Example 2 except that phosphorus added in the step (III) was replaced by silicon.

This ferromagnetic metallic particle sample was examined in the same manner as that of Example 1. The results are given in Table 3 and FIGS. 1, 2 and 3(a).

EXAMPLE 7

As shown in Table 1, ferromagnetic metallic particles for magnetic recording having a composition specified in Table 2 were prepared by the same process under the same conditions as those of Example 1 except that the phosphorus to be added in the step (III) was replaced by a combination of phosphorus and silicon.

This ferromagnetic metallic particle sample was examined in the same manner as that of Example 1. The results are given in Table 3 and FIGS. 1, 2 and 3(a).

EXAMPLE 8

As shown in Table 1, ferromagnetic metallic particles for magnetic recording having a composition specified in Table 2 were prepared by the same process under the same conditions as those of Example 1 except that the amount of the sodium aluminate to be added in the step (II) was changed.

This ferromagnetic metallic particle sample was examined in the same manner as that of Example 1. The results are given in Table 3 and FIGS. 1, 2 and 3(a).

EXAMPLE 9

As shown in Table 1, ferromagnetic metallic particles for magnetic recording having a composition specified in Table 2 were prepared by the same process under the same conditions as those of Example 1 except that the amount of sodium aluminate to be added in the step (II) and the ratio of the amount of the iron of the step (I) to that of the step (II) were changed and that the phosphorus to be added in the step (III) was replaced by a combination of phosphorus and silicon.

This ferromagnetic metallic particle sample was examined in the same manner as that of Example 1. The results are given in Table 3 and FIGS. 1, 2 and 3(a).

EXAMPLES 10 and 11

As shown in Table 1, ferromagnetic metallic particles for magnetic recording each having a composition specified in Table 2 were prepared by the same process under the same conditions as those of Example 2 except that the amount of the sodium hydroxide to be added in the step (I) was changed to thereby change the alkali concentration.

These ferromagnetic metallic particle samples were each examined in the same manner as that of Example 1. The results are given in Table 3 and FIGS. 1, 2 and 3(a).

COMPARATIVE EXAMPLE 1

As shown in Table 1, sodium aluminate was added in the step (I) to give a slurry of an aluminum-containing iron oxide hydrate. The slurry contained an excess of the aluminate ions.

The step (II) was omitted. In the step (III), the slurry was washed, followed by the deposition of aluminum and phosphorus. The subsequent stages were carried out in the same manner as those of Example 1. Thus, ferromagnetic metallic particles for magnetic recording having a composition specified in Table 2 were obtained.

Figure 3B:
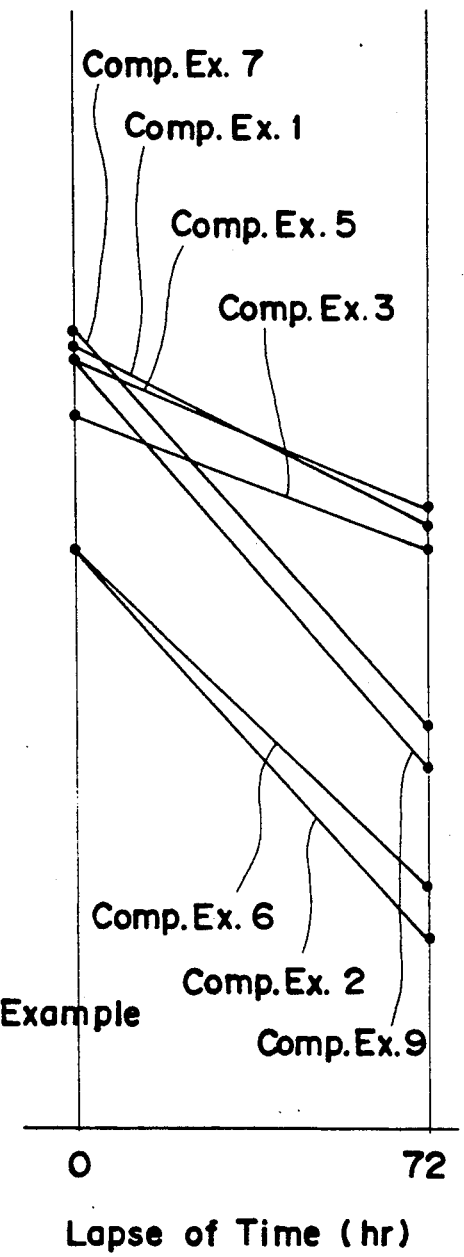

This ferromagnetic metallic particle sample was examined in the same manner as that of Example 1. The results are given in Table 3 and FIGS. 1, 2 and 3(b).

COMPARATIVE EXAMPLE 2

As shown in Table 1, a slurry containing iron oxide hydrate was prepared in the step (I), followed by the addition of sodium aluminate in the step (II). Thus, a slurry of aluminum-containing iron oxide hydrate was obtained. This slurry did not contain an excess of aluminate ions.

In the step (III), the slurry was washed, followed by the deposition of aluminum and phosphorus. The subsequent stages were carried out in the same manner as those of Example 1 to give ferromagnetic metallic particles for magnetic recording having a composition specified in Table 2.

This ferromagnetic metallic particle sample was examined in the same manner as that of Example 1. The results are given in Table 3 and FIGS. 1, 2 and 3(b).

COMPARATIVE EXAMPLE 3

As shown in Table 1, ferromagnetic metallic particles for magnetic recording having a composition specified in Table 2 were prepared by the same process under the same conditions as those of Comparative Example 1 except that nickel sulfate was further added in the step (I).

This ferromagnetic metallic particle sample was examined in the same manner as that of Example 1. The results are given in Table 3 and FIGS. 1, 2 and 3(b).

COMPARATIVE EXAMPLE 4

As shown in Table 1, ferromagnetic metallic particles for magnetic recording having a composition specified in Table 2 were prepared by the same process under the same conditions as those of Comparative Example 1 except that the amount of the sodium aluminate to be added in the step (I) was changed and that an aqueous solution of phosphoric acid was added in the step (III) without preliminarily washing the slurry.

It was confirmed by transmission electron microscopy (TEM) that the obtained ferromagnetic metallic particles were contaminated with magnetite.

COMPARATIVE EXAMPLE 5

As shown in Table 1, the steps (I) and (II) were carried out in the same manner as those of Comparative Example 2 except that the amount of the sodium aluminate to be added and the alkali concentration was changed and that an excess of aluminate ions remained. Thus, a slurry containing aluminum-containing iron oxide hydrate was obtained, followed by the addition of an aqueous solution of phosphoric acid. The subsequent stages were carried out in the same manner as that of Example 1 to give ferromagnetic metallic particles for magnetic recording having a composition specified in Table 2.

This ferromagnetic metallic particle sample was examined in the same manner as that of Example 1. The results are given in Table 3 and FIGS. 1, 2 and 3(b).

COMPARATIVE EXAMPLE 6

As shown in Table 1, ferromagnetic metallic particles for magnetic recording having a composition specified in Table 2 were prepared by the same process under the same conditions as those of Comparative Example 2 except that sodium aluminate was added in the step (I), that the alkali concentration was changed, and that the amount of the sodium aluminate to be added in the step (II) was changed.

This ferromagnetic metallic particle sample was examined in the same manner as that of Example 1. The results are given in Table 3 and FIGS. 1, 2 and 3(b).

COMPARATIVE EXAMPLE 7

As shown in Table 1, a slurry of aluminum-containing iron oxide hydrate was prepared in the same manner as that of Comparative Example 2 except that the amount of the sodium aluminate to be added in the step (II) was changed and that the ratio of the amount of the iron of the step (I) to that step (II) was changed. This slurry did not contain an excess of aluminate ions.

In the step (III), the slurry was washed, followed by the deposition of silicon and nickel. The subsequent stages were carried out in the same manner as those of Example 1. Thus, ferromagnetic metallic particles for magnetic recording having a composition specified in Table 2 were obtained.

This ferromagnetic metallic particle sample was examined in the same manner as that of Example 1. The results are given in Table 3 and FIGS. 1, 2 and 3(b).

COMPARATIVE EXAMPLE 8

As shown in Table 1, a slurry of aluminum-containing iron oxide hydrate was prepared in the same manner as that of Comparative Example 1 except that the amount of the sodium aluminate to be added in the step (I) was changed and that the alkali concentration was changed. This slurry did not contain an excess of aluminate ions. The subsequent stages were carried out in the same manner as those of Example 1. Thus, ferromagnetic metallic particles for magnetic recording having a composition specified in Table 2 were obtained.

It was confirmed by transmission electron microscopy (TEM) that the obtained ferromagnetic metallic particles were contaminated with magnetite.

COMPARATIVE EXAMPLE 9

As shown in Table 1, a slurry of aluminum-containing iron oxide hydrate was prepared in the same manner as that of Comparative Example 1 except that the amount of the sodium aluminate to be added in the step (I) was changed, that a predetermined amount of phosphoric acid was added, and that the alkali concentration was changed. This slurry did not contain an excess of aluminate ions.

In the step (III), the slurry was washed, followed by the deposition of phosphorus and nickel. The subsequent stages were carried out in the same manner as those of Example 1. Thus, ferromagnetic metallic particles for magnetic recording having a composition specified in Table 2 were obtained.

This ferromagnetic metallic particle sample was examined in the same manner as that of Example 1. The results are given in Table 3 and FIGS. 1, 2 and 3(b).

TABLE 2

| Ex. & Comp. Ex. | Composition of ferromagnetic metallic particles[7] | | | | |
|---|---|---|---|---|---|
|  | Ni | Mn | Al | P | Si |
| Ex. 1 | 3.3 | 0.7 | 10.0 | 0.8 |  |
| Ex. 2 | 3.3 |  | 10.0 | 0.8 |  |
| Ex. 3 | 1.2 |  | 10.0 | 0.8 |  |
| Ex. 4 | 3.3 |  | 5.5 | 0.8 |  |
| Ex. 5 | 1.8 |  | 10.4 | 0.8 |  |
| Ex. 6 | 3.3 |  | 10.0 |  | 0.8 |
| Ex. 7 | 3.3 | 0.7 | 10.0 | 0.4 | 0.4 |
| Ex. 8 | 3.3 | 0.7 | 5.5 | 0.8 |  |
| Ex. 9 | 2.5 | 0.7 | 10.0 | 0.4 | 0.4 |
| Ex. 10 | 3.3 |  | 10.0 | 0.8 |  |
| Ex. 11 | 3.3 |  | 10.0 | 0.8 |  |
| Comp. Ex. 1 |  |  | 9.1 | 0.9 |  |
| Comp. Ex. 2 |  |  | 10.0 | 0.9 |  |
| Comp. Ex. 3 | 3.2 |  | 9.1 | 0.9 |  |
| Comp. Ex. 4 | 3.2 |  | 10.0 | 0.9 |  |
| Comp. Ex. 5 |  |  | 10.0 | 0.9 |  |
| Comp. Ex. 6 | 2.1 |  | 10.1 | 0.9 |  |
| Comp. Ex. 7 | 8.9 |  | 4.9 |  | 5.0 |
| Comp. Ex. 8 |  |  | 10.0 |  |  |
| Comp. Ex. 9 | 9.5 |  | 4.0 | 0.52 |  |

[7]atomic proportions calculated by assuming the total amount of the iron to be 100

TABLE 1

| Ex. & Comp. Ex. | Step (I) | | | | | Step (II) | | amount[3] of Al con- | | ratio of the Fe of step (I) and of step (II)[4] | | Step (III) | | | | | | |
|---|---|---|---|---|---|---|---|---|---|---|---|---|---|---|---|---|---|---|
|  | amount[1] | | | | alkali concn. (mol/l) | amount[2] Al | alkali concn. (mol/l) | tained | free | (I) | (II) | amount[5] | | | amount[6] | | | |
|  | Ni | Mn | Al | P |  |  |  |  |  |  |  | P | Si | pH | Al | P | Si | Ni |
| Ex. 1 | 5.0 | 1.0 |  |  | 2.5 | 29 | 1.5 | 7.0 | 3.0 | 65.5 | 34.5 | 0.8 |  |  |  |  |  |  |
| Ex. 2 | 5.0 |  |  |  | 2.5 | 29 | 1.5 | 7.0 | 3.0 | 65.5 | 34.5 | 0.8 |  |  |  |  |  |  |
| Ex. 3 | 1.85 |  |  |  | 2.5 | 29 | 1.5 | 7.0 | 3.0 | 65.5 | 34.5 | 0.8 |  |  |  |  |  |  |
| Ex. 4 | 5.0 |  |  |  | 2.5 | 16 | 1.5 | 4.0 | 1.5 | 65.5 | 34.5 | 0.8 |  |  |  |  |  |  |
| Ex. 5 | 5.0 |  |  |  | 3.0 | 16 | 1.5 | 7.4 | 3.0 | 35.0 | 65.0 | 0.8 |  |  |  |  |  |  |
| Ex. 6 | 5.0 |  |  |  | 2.5 | 29 | 1.5 | 7.0 | 3.0 | 65.5 | 34.5 |  | 0.8 |  |  |  |  |  |
| Ex. 7 | 5.0 | 1.0 |  |  | 2.5 | 29 | 1.5 | 7.0 | 3.0 | 65.5 | 34.5 | 0.4 | 0.4 |  |  |  |  |  |
| Ex. 8 | 5.0 | 1.0 |  |  | 2.5 | 16 | 1.5 | 4.0 | 1.5 | 65.5 | 34.5 | 0.8 |  |  |  |  |  |  |
| Ex. 9 | 5.0 | 1.0 |  |  | 3.0 | 20 | 1.5 | 7.0 | 3.0 | 50.0 | 50.0 | 0.4 | 0.4 |  |  |  |  |  |
| Ex. 10 | 5.0 |  |  |  | 1.5 | 29 | 0.7 | 7.0 | 3.0 | 65.5 | 34.5 | 0.8 |  |  |  |  |  |  |
| Ex. 11 | 5.0 |  |  |  | 6.0 | 29 | 4.0 | 7.0 | 3.0 | 65.5 | 34.5 | 0.8 |  |  |  |  |  |  |
| Comp. Ex. 1 |  | 3.0 |  |  | 1.5 |  |  | 2.1 | 0.9 | 100 |  |  |  | 10 | 7.0 | 0.9 |  |  |
| Comp. Ex. 2 |  |  |  |  | 2.5 | 20 | pH 10 | 7.0 | 0.0 | 65.5 | 34.5 |  |  |  |  |  |  |  |
| Comp. Ex. 3 | 3.2 | 3.0 |  |  | 1.5 |  |  | 2.1 | 0.9 | 100 |  |  |  | 10 | 7.0 | 0.9 |  |  |
| Comp. Ex. 4 | 3.2 | 10.0 |  |  | 1.5 |  |  | 7.0 | 3.0 | 100 |  | 0.9 |  |  |  |  |  |  |
| Comp. Ex. 5 |  |  |  |  | 2.5 | 29 | 1.5 | 7.0 | 3.2 | 65.5 | 34.5 | 0.9 |  |  |  |  |  |  |
| Comp. Ex. 6 | 3.2 |  |  |  | 2.5 | 3 | pH 10 | 1.1 | 0.0 | 65.5 | 34.5 |  |  | 10 | 9.0 | 0.9 |  |  |
| Comp. Ex. 7 |  |  |  |  | 1.0 | 30 | pH 11 | 4.9 | 0.0 | 70.0 | 30.0 |  |  | 9.5 |  | 5.0 |  | 9.0 |
| Comp. Ex. 8 |  | 10.0 |  |  | 0.36 |  |  | 10.0 | 0.0 | 100 |  |  |  |  |  |  |  |  |
| Comp. Ex. 9 |  | 4.0 | 0.16 |  | 0.5 |  |  | 4.0 | 0.0 | 100 |  |  |  |  | 9.0 | 0.36 |  | 9.5 |

[1]atomic proportions calculated by assuming the amount of the iron of the step (I) to be 100,
[2]atomic proportions calculated by assuming the amount of the iron of the step (II) to be 100,
[3]atomic proportions calculated by assuming the amount of the iron of both the step (I) and the step (II) to be 100,
[4]atomic proportions calculated by assuming the total amount of the iron to be 100
[5]the amount of deposits during the deposition of free aluminum (atomic proportions calculated by assuming the total amount of the iron to be 100),
[6]the amount of deposits after the washing of the slurry (atomic proportions calculated by assuming the total amount of the iron to be 100)

TABLE 3

| Ex. & Comp. Ex. | Properties of ferromagnetic metallic particles | | | Magnetic properties | | | | degree of deterioration of magnetization (%) | Sheet properties | | | | | | | |
|---|---|---|---|---|---|---|---|---|---|---|---|---|---|---|---|---|
|  | specific surface area (m²/g) | mean length (μm) | mean diameter (μm) | Hc (Oe) | σs (emu/g) | SFD | σs after 72 hr (emu/g) |  | gloss of sheet (gloss value) | | | | squareness (%) | | | |
|  |  |  |  |  |  |  |  |  | 1 hr | 2 hr | 3 hr | 6 hr | 1 hr | 2 hr | 3 hr | 6 hr |
| Ex. 1 | 60 | 0.26 | 0.020 | 1500 | 128 | 1.00 | 124 | 3.13 | 115 | 160 | 168 | 170 | 77 | 83 | 84 | 85 |
| Ex. 2 | 58 | 0.28 | 0.023 | 1510 | 130 | 1.00 | 119 | 8.46 | 105 | 160 | 167 | 167 | 76 | 83 | 83 | 84 |
| Ex. 3 | 56 | 0.31 | 0.023 | 1500 | 132 | 0.98 | 122 | 7.58 | 99 | 155 | 160 | 163 | 78 | 85 | 86 | 86 |
| Ex. 4 | 54 | 0.28 | 0.024 | 1500 | 135 | 1.06 | 122 | 9.63 | 103 | 151 | 163 | 163 | 75 | 82 | 82 | 83 |
| Ex. 5 | 54 | 0.12 | 0.024 | 1660 | 133 | 1.06 | 123 | 7.52 | 105 | 159 | 170 | 172 | 79 | 85 | 88 | 89 |
| Ex. 6 | 57 | 0.28 | 0.023 | 1500 | 130 | 0.98 | 121 | 7.44 | 100 | 162 | 170 | 172 | 75 | 82 | 84 | 84 |
| Ex. 7 | 60 | 0.26 | 0.021 | 1540 | 128 | 0.98 | 125 | 2.34 | 104 | 154 | 167 | 170 | 76 | 83 | 84 | 84 |
| Ex. 8 | 55 | 0.27 | 0.023 | 1520 | 134 | 1.00 | 127 | 5.22 | 102 | 152 | 165 | 165 | 76 | 82 | 83 | 83 |
| Ex. 9 | 56 | 0.15 | 0.023 | 1600 | 133 | 1.04 | 127 | 4.51 | 111 | 162 | 172 | 172 | 79 | 84 | 86 | 87 |

TABLE 3-continued

| Ex. & Comp. Ex. | Properties of ferromagnetic metallic particles | | | Magnetic properties | | | | degree of deterioration of magnetization (%) | Sheet properties | | | | | | | |
|---|---|---|---|---|---|---|---|---|---|---|---|---|---|---|---|---|
| | specific surface area (m²/g) | mean length (μm) | mean diameter (μm) | Hc (Oe) | σs (emu/g) | SFD | σs after 72 hr (emu/g) | | gloss of sheet (gloss value) | | | | squareness (%) | | | |
| | | | | | | | | | 1 hr | 2 hr | 3 hr | 6 hr | 1 hr | 2 hr | 3 hr | 6 hr |
| Ex. 10 | 62 | 0.26 | 0.022 | 1500 | 129 | 1.02 | 117 | 9.30 | 105 | 159 | 164 | 165 | 77 | 82 | 82 | 83 |
| Ex. 11 | 56 | 0.30 | 0.024 | 1530 | 133 | 0.98 | 122 | 7.52 | 104 | 158 | 167 | 167 | 78 | 83 | 84 | 85 |
| Comp Ex. 1 | 52 | 0.31 | 0.025 | 1250 | 134 | 1.31 | 123 | 8.21 | 92 | 134 | 139 | 150 | 70 | 72 | 74 | 76 |
| Comp Ex. 2 | 59 | 0.27 | 0.021 | 1370 | 120 | 1.30 | 93 | 22.5 | 83 | 117 | 129 | 148 | 71 | .73 | 77 | 78 |
| Comp Ex. 3 | 58 | 0.24 | 0.021 | 1420 | 128 | 1.45 | 120 | 6.25 | 91 | 138 | 145 | 156 | 74 | 77 | 80 | 81 |
| Comp Ex. 4 | magnetite formed | | | | | | | | | | | | | | | |
| Comp Ex. 5 | 53 | 0.26 | 0.022 | 1340 | 133 | 1.15 | 123 | 7.52 | 95 | 138 | 143 | 149 | 71 | 75 | 78 | 78 |
| Comp Ex. 6 | 57 | 0.24 | 0.022 | 1390 | 120 | 1.32 | 97 | 19.2 | 80 | 112 | 127 | 145 | 70 | 77 | 80 | 81 |
| Comp Ex. 7 | 51 | 0.26 | 0.020 | 1560 | 135 | 0.98 | 108 | 20.0 | 51 | 86 | 119 | 150 | 69 | 74 | 79 | 81 |
| Comp Ex. 8 | magnetite formed | | | | | | | | | | | | | | | |
| Comp Ex. 9 | 53 | 0.24 | 0.021 | 1480 | 133 | 1.11 | 105 | 21.1 | 48 | 83 | 112 | 149 | 68 | 72 | 77 | 78 |

It can be understood from the results given in Table 3 with respect to sheet properties and FIGS. 1 and 2 that the ferromagnetic metallic particles prepared in Examples 1 to 11 are superior to those prepared in Comparative Examples 1 to 3, 5 to 7 and 9 in the dispersibility, particularly in the easiness of dispersion.

Further, it can be understood from the results given in Table 3 with respect to magnetic properties and FIGS. 3(a) and (b) that the ferromagnetic metallic particles prepared in Examples 1 to 11 are more excellent in magnetic properties and more improved in magnetic stability than those of Comparative Examples 1 to 3, 5 to 7 and 9. Particularly, the ferromagnetic metallic particles prepared in Examples 1 and 7 to 9 each containing a specific amount of manganese are remarkably improved in magnetic stability.

What is claimed is:

1. A process for the preparation of ferromagnetic metallic particles for magnetic recording, which comprises
    (I) a step of mixing a mixed aqueous solution of a ferrous salt and a nickel salt with an excess of an aqueous solution of an alkali, stirring the obtained mixture sufficiently, and oxidizing the mixture to give a slurry of nickel-containing acicular iron oxide hydrate,
    (II) a step of sufficiently stirring a mixture prepared by adding an aqueous solution of a ferrous salt and an excess of an aqueous solution of an aluminum salt or an aluminate to the slurry obtained in the step (I) and oxidizing the obtained mixture to thereby coat the surface of the nickel-containing iron oxide hydrate with aluminum-containing iron oxide hydrate at an alkali concentration of 0.5 to 5.0 mol/l, thus giving a slurry containing the coated iron oxide hydrate and free aluminate ions,
    (III) a step of sufficiently stirring a mixture prepared by adding an aqueous solution of phosphoric acid or a salt thereof and/or an aqueous solution of silicic acid or a salt thereof to the slurry obtained in the step (II), neutralizing the obtained mixture, and aging the neutralized mixture to thereby deposit aluminum and phosphorus and/or silicon on the outside surface of the aluminum-containing iron oxide hydrate, thereby giving a slurry of the iron oxide hydrate thus treated, and
    (IV) a step of subjecting the obtained slurry to washing, drying and dehydrating, reducing the dehydrated particles in a reducing gas, and forming an oxide layer on the surface of the reduced particles.

2. A process for the preparation according to claim 1, wherein a manganese salt is used in addition to the nickel salt in the step (I) to give a slurry of acicular iron oxide hydrate containing nickel and manganese.

3. A process for the preparation according to claim 1, wherein a concentration of unreacted alkali is 1.0–7.0 mol/l as NaOH after the completion of the reaction in the step (I).

4. A process for the preparation according to claim 2, wherein a concentration of unreacted alkali is 1.0–7.0 mol/l as NaOH after the completion of the reaction in the step (I).

5. A process for the preparation according to claim 1, wherein the oxidation in the step (I) is conducted at 20°–60° C.

6. A process for the preparation according to claim 2, wherein the oxidation in the step (I) is conducted at 20°–60° C.

7. A process for the preparation according to claim 2, wherein the contents of nickel and manganese in iron oxide hydrate obtained in the step (I) be 1.1 to 10 atomic % and 0 to 10 atomic % respectively based on the amount of the iron in the iron oxide hydrate obtained in the step (I).

8. A process for the preparation according to claim 1, wherein the alkali concentration of the slurry is 1.0 to 3.0 mol/l after the completion of the step (II).

9. A process for the preparation according to claim 2, wherein the alkali concentration of the slurry is 1.0 to 3.0 mol/l after the completion of the step (II).

10. A process for the preparation according to claim 1, wherein the aluminum content of the aluminum-containing iron oxide hydrate is 2.0 to 10 atomic % based on the total amount of the iron in the iron oxide hydrate obtained in the steps (I) and (II).

11. A process for the preparation according to claim 2, wherein the aluminum content of the aluminum-containing iron oxide hydrate is 2.0. to 10 atomic % based on the total amount of the iron in the iron oxide hydrate obtained in the steps (I) and (II).

12. A process for the preparation according to claim 1, wherein the ratio of the amount of iron in the iron oxide hydrate containing nickel to the total amount of the whole iron is 30–90%.

13. A process for the preparation according to claim 2, wherein the ratio of the amount of iron in the iron oxide hydrate containing nickel and manganese to the total amount of the whole iron is 30-90%.

14. A process for the preparation according to claim 1, wherein the drying is conducted at 100° to 200° C., the dehydration is conducted at 300° to 800° C. and the reduction is conducted at 400° to 550° C., respectively in the step (IV).

15. A process for the preparation according to claim 2, wherein the drying is conducted at 100° to 200° C., the dehydration is conducted at 300° to 800° C. and the reduction is conducted at 400° to 550° C., respectively in the step (IV).

16. A process for the preparation according to claim 2, wherein the ferromagnetic metallic particles for magnetic recording contain 1.0 to 5.0 atomic % of nickel, 0 to 5.0 atomic % of manganese, 3.0 to 15 atomic % of aluminum, and 0.3 to 1.5 atomic % of phosphorus and/or silicon based on the amount of the iron contained therein.

17. A process for the preparation according to claim 1, wherein the ferromagnetic metallic particles for magnetic recording have a mean length of 0.10 to 0.35 μm, a mean diameter of 0.015 to 0.025 μm, a length to diameter ratio of 5.0 to 25, and a specific surface area of 50 to 70 m$^2$/g.

18. A process for the preparation according to claim 2, wherein the ferromagnetic metallic particles for magnetic recording have a mean length of 0.10 to 0.35 μm, a mean diameter of 0.015 to 0.025 μm, a length to diameter ratio of 5.0 to 25, and a specific surface area of 50 to 70 m$^2$/g.

* * * * *